US006935641B2

(12) United States Patent
Hahn

(10) Patent No.: US 6,935,641 B2
(45) Date of Patent: Aug. 30, 2005

(54) PORTABLE COMBINATION TOOLBOX, WORKBENCH, AND DISPENSING CRIB

(76) Inventor: Richard Duk Wong Hahn, 553 Great Bend Dr., Diamond Bar, CA (US) 91765

( * ) Notice: Subject to any disclaimer, the term of this patent is extended or adjusted under 35 U.S.C. 154(b) by 117 days.

(21) Appl. No.: 10/406,932

(22) Filed: Apr. 3, 2003

(65) Prior Publication Data

US 2004/0195790 A1 Oct. 7, 2004

(51) Int. Cl.[7] ................................................. B62B 1/00
(52) U.S. Cl. .................................................. 280/47.19
(58) Field of Search .......................... 280/47.17, 47.24, 280/47.26, 47.19, 47.35, 79.3, 47.33; 312/140.2, 249.8; 206/372, 373; 108/33, 93; 144/285

(56) References Cited

U.S. PATENT DOCUMENTS

| | | |
|---|---|---|
| 1,027,945 A | 5/1912 | Walker |
| 1,230,238 A | 6/1917 | Templeton |
| 1,352,234 A | 9/1920 | Whitten |
| 2,459,301 A | 1/1949 | Adams |
| 2,609,072 A | 9/1952 | Levinson |
| 2,639,957 A | 5/1953 | Geller |
| 2,977,175 A | 3/1961 | Bonomo |
| 3,092,428 A | 6/1963 | Kerschner |
| 3,278,249 A | 10/1966 | Howe |
| D252,197 S | 6/1979 | Gale |
| 4,350,366 A | 9/1982 | Helms |
| 4,953,601 A | 9/1990 | Herdies |
| 5,064,256 A | 11/1991 | Shepherd |
| 5,148,917 A | 9/1992 | LeBrun |
| 5,224,531 A | 7/1993 | Blohm |
| 5,338,049 A | 8/1994 | Goring |
| 5,893,572 A | 4/1999 | Parks |
| 5,927,837 A | 7/1999 | Schmidt |
| 6,086,073 A | 7/2000 | Tisbo et al. |
| 2002/0117947 A1 | 8/2002 | Cheng |

Primary Examiner—Bryan Fischmann
(74) Attorney, Agent, or Firm—Gene Scott Patent Law & Venture Group

(57) ABSTRACT

The portable toolbox has a top, bottom, front and rear panels forming a box structure with opposing sides tilted off-vertical so as to converge upwardly. A plurality of hinged drawers and fixed bins are arranged on each side of the toolbox. The rear panel terminates at a pair of supporting feet for resting the apparatus on a supporting surface and a pair of wheels for moving the toolbox. By lifting the toolbox from its forward end, the toolbox moves from resting on its rear legs, to resting on its rear wheels. The top panel provides an upwardly facing work surface with a pair of hand holes separated by a hand grip for carrying the apparatus. A forward and a rearward sliding retractable work surface extender frames are positionable between a retracted position, secured within the box structure and an extended position directed outwardly from the box structure for resting a workpiece.

4 Claims, 4 Drawing Sheets

PORTABLE COMBINATION TOOLBOX, WORKBENCH, AND DISPENSING CRIB

RELATED APPLICATIONS

This is a substitute application of a prior filed application having Ser. No. 09/909,203 and file date of Jul. 18, 2001.

INCORPORATION BY REFERENCE

Applicant(s) hereby incorporate herein by reference, any and all U.S. patents referred to in this application.

BACKGROUND OF THE INVENTION

1. Field of the Invention

This invention relates generally to tool boxes and work benches and more particularly to a portable toolbox that functions as a work bench and stool.

2. Description of Related Art

The following art defines the present state of this field:

Gale, U.S. Pat. No. D252,197 describes a combined tool cart and work table design.

Walker, U.S. Pat. No. 1,027,945 describes a bin casing having a pivotal member comprising an angular flange; of a bin mounted in said casing and removably supported upon the angular ridge of said flange; and a vertical flange plate opposite to said pivotal flange arranged to limit the tilting motion of said bin, having its upper region engaging the free edge of the top wall of said casing, and having a bracing web formed by its lower margin extending obliquely within said casing in engagement with—said top wall.

Templeton, U.S. Pat. No. 1,230,238 describes a supporting structure having a vertical back wall, of a pivotal bulk-holder having an arcuate bottom from the extremities of which tangential front and rear walls converge along straight lines toward a meeting point or apex, the holder being mounted eccentrically, the rear wall of the holder having an access opening extending from its upper extremity and of sufficient size to receive a bulk removing element, the side walls of the holder having straight free edges in the same plane with the outer face of the rear wall of the holder, said edges and face being movable to position flat against the vertical wall of the supporting structure to seal the access opening.

Whitten, U.S. Pat. No. 1,352,234 describes a wardrobe trunk, of detachable frames for supporting the trunk on end, one part of the trunk resting on one frame and the other part on the other frame, said frames having portions pivotally connected whereby the frames may closed together or opened horizontally correspondingly moving the parts of the trunk.

Adams, U.S. Pat. No. 2,459,301 describes a cabinet having upper and lower panels defining an opening, the combination of a bin within said opening, having a rearwardly converging top and bottom and provided with a front plate extending above the bottom of the upper panel and below the top of the lower panel and outside of said panels, the forward top of said bin being normally free of the bottom of said upper panel and the forward bottom of said bin normally resting on said louver, panel and pivoting the bin, the bottom of said bin having depending flanges provided with inclines terminating in projections spaced from the bottom of the bin and normally bearing against the rear of said lower panel, whereby the front plate of the bin is caused to engage the outside of the upper panel to support the bin within the opening in the cabinet, said bin being tiltable on said louver panel to a position without said opening,—and said projections on said flanges engaging the inside of said lower panel while the converging top of the bin engages the bottom of the upper panel to hold the bin in withdrawn position.

Levinson, U.S. Pat. No. 2,609,072 describes a box structure having top, bottom, and side walls, a member journalled for rotary movement within the box about a substantially horizontal axis near a side wall and below the top wail, an elongated leg member normally lying substantially within the box; said leg member being slidably mounted on the journalled member for axial movement transversely of said horizontal aids; a leg-engaging member mounted within the box above the journalled member and spaced therefrom to engagingly receive an end of the leg member when the leg member is moved to operative position; the side and bottom walls being provided with an opening through which the leg may be manually slid outwardly of the box in a substantially horizontal direction and for the greater part of its length, then swung downwardly about the horizontal axis of said member to substantially upright position, and then pushed upwardly into engagement with the leg-engaging member.

Geller, U.S. Pat. No. 2,639,957 describes a combination having a storage cabinet for reels of film, a plurality of bins, means for automatically controlling the position of each bin of said cabinet, said means comprising a keeper-plate secured to the interior of said cabinet, said plate having spaced depending ear extensions with coinciding slots therein, a rod slidably positioned in the slots of said ears, a spiral spring surrounding said rod and having one of its ends secured thereto and the other of said ends secured to said plate to normally but yieldingly abut said rod against the front portions of each of said bins, and a stop secured to said rod to prevent its displacement from the slots, said spring being strong enough to prevent full closure of the bin when unloaded but weak enough to allow full closure thereof when loaded.

Bonomo, U.S. Pat. No. 2,977,175 describes a waste receptacle, in combination, a single-piece molded housing for a waste receiver, said housing having a rectangular opening for receiving a waste receiver and having a base portion forming a sill forward of the opening and inclined downwardly in a direction away from the opening, a molded waste receiver normally housed in said housing in a seated position, said housing having a front body portion provided with said opening having a transversely arcuate lower part thereof defining a transversely arcuate lower edge on said opening, the receiver having a front wall transversely arcuate on at least a lower portion thereof extending laterally beyond opposite side walls of the receiver and cooperating with marginal portions of the front body portion of the housing on opposite side edges of said opening in limiting inward movement of the receiver, the lower edges of the laterally extending portions only cooperating with said sill for rockably supporting said receiver when rocked in a direction away from said seated position, means on said receiver for selectively rocking it away from said seated position in a direction opposite from a direction for seating the receiver in position thereby to render the receiver ready to receive waste in a waste-receiving position, said sill having opposite corners next adjacent the housing front body portion disposed adjacent and below the side edges of the rectangular opening, said corners being arcuate in configuration rounded off downwardly in a laterally outward direction, whereby the lower edge of the laterally extending portions of the receiver cooperate with the surface of the sill along limited bearing surfaces.

Kerschner, U.S. Pat. No. 3,092,428 describes a tool chest comprising, in combination, an elongated housing, said housing having a top, a bottom, sides, and frame members connecting each corner of said top with a like corner of said bottom, said sides tapering from said top to said bottom and hingedly connected to said top, each of said sides having an upper and lower section hingedly connected together, key type lock means carried by each of said lower sections of said sides to secure said sides to said bottom, two panels each having a plurality of perforations therethrough, one of said panels extending between said frame members at each side of said housing, said panels being covered by said sides and spaced therefrom, said housing having a shelf secured to said frame members and positioned between said top, said bottom and said panels and extending the entire length of said housing, a lid hingedly mounted on each end of said shelf to close the ends of said housing between said shelf and said top, each of said lids having an inwardly extending flange at each side thereof, an opening in each of said flanges, four mounting bolts, one of said bolts being positioned at the upper and outer corners of each of said panels, a helical spring surrounding the shank portion of each of said bolts and engaging said panel and the head of said bolts to urge said bolts outwardly, said bolts being urged inwardly through said openings in said flanges of said lids by said sides when closed to lock said lids, three vertically spaced drawers in each end of said housing between said shelf and said bottom, an elongated channel shaped member removably secured by mounting bolts to each side of each of said drawers, another channel shaped member secured by mounting bolts to the inside of said panel opposite each of said first named channel shaped members, and elongated guides for said channel members, one of said ties being positioned between said channel member, on each side of each of said drawers and said channel members on said panel, said guides having lips extending outwardly from each side at the top and bottom edges thereof, said guides receiving the edges of said channel shaped members in said lips, two hooks mounted on each of said guides, one of said hooks being positioned at one end of said guide and extending from one face thereof and the other of said hooks being positioned at the other end of said guides and extending from the other face thereof, said hooks being engageable with the mounting bolts for said channel members to limit travel of said guide and said channel members in operation, the inner end of each of said drawers having a hook thereon, said last named hooks being vertically aligned, said hooks on said drawers at one end of said housing facing one of said sides of said housing and said hooks on said drawers at the other end of said housing facing the other of said sides of said housing, a locking frame, said locking frame having parallel upper and lower members joined at the ends by spaced and parallel rods, said locking frame being pivotally connected to said bottom and said shelf between the inner ends of said drawers, an operator rod pivotally connected at its inner end to said lower member of said locking frame, and extending outwardly through one of said panels, said locking frame being positioned so that said bars can be received by said hooks on said drawers when in the closed position to lock same, the outer end of said operator bar being positioned adjacent to said panel when said drawers are locked, said lower section of one of said sides engaging said outer end of said operator bar when said side is closed, said operator bar being movable to pivot said locking frame and move said bars out of engagement with said hooks to open said drawers, a hook at the outer edges of each of said lower sections of said sides, pins secured to said frame members and projecting inwardly to be engaged by said last named hooks when said lower sections of said sides are in the closed position, said tool chest being constructed and adapted so that said drawers can be locked when closed by moving said. Operator bar inwardly against said panel and said lids to said up per portion of said ends will be locked when said upper section of said sides are closed depressing said mounting pin and forcing the shank portion thereof through said openings in said flanges on said lids, and said sides can be held in position by said hooks thereon engaging said pins on said frame members and by said key locking means at the lower edges thereof, and said panels can receive hooks or the like to mount tools thereon.

Jordan, U.S. Pat. No. 3,118,685 describes a portable combination tool chest and work bench, including: two laterally spaced side walls having transversely aligned, elongate openings formed in the lower portions thereof, said side walls each having a straight upper edge, a rear edge, a lower edge shorter than said upper edge and parallel thereto, a forward edge shorter than said rear edge and parallel thereto, and an upwardly and forwardly inclined edge that extends upwardly from the forward end of said lower edge to effect a junction with the lower end of said forward edge; rear and forward end pieces that extend transversely between said side walls; a first rigid sheet parallel to said upper edges and disposed within the confines of said side walls and end pieces and affixed to the interior surfaces thereof above said openings, which first sheet, end pieces and side walls cooperatively define a tool chest; a second rigid sheet parallel to said first sheet and spaced below said openings, said second sheet being situated within the confines of said side walls and rear end piece affixed to the interior surfaces thereof, which second sheet services as a temporary support for tools when not in said chest; a rigid rectangular cover which is longer than said side walls and sufficiently wide to extend between the exterior surfaces of said side walls when resting on said upper edges thereof and the upper edges of said rear and forward end pieces said cover having end portions that overhang said rear and forward end pieces; hinge means pivotally connecting one longitudinal edge of said cover to one of said side walls to permit said cover to be pivoted into a position where access may be had to said chest and for holding said cover in a fixed longitudinal and transverse position relative to said side walls and end walls whereby said cover, said walls and end pieces cooperatively provide said work bench; means for locking said cover in a position to close said chest when said end pieces; two laterally separated wheels; means for locking said cover in a position to close said chest when said cover rests on said upper edges of said side walls and said end pieces; two laterally separated wheels; means for rotatably supporting said wheels from said side walls adjacent said upwardly and forwardly inclined edges thereof; handle means extending rearwardly from said rear end piece for moving said cover, side walls and end pieces as an integral unit on said wheels to a desired location; and leg means extending downwardly from the rearward portion of said second sheet for disposing said cover in a horizontal plane when said cover rests on said upper edges to permit said cover to be used for a work bench surface, which cover, side walls, end pieces and first and second sheets are capable of occupying upwardly and rearwardly extending positions when said junctions contact the same surface on which said wheels rest.

Howe, U.S. Pat. No. 3,278,249 describes a container comprising an upwardly open body with a front wall, a rear wall, two side walls and a bottom interconnecting said walls, said walls rising substantially perpendicularly from said bottom, said front and rear walls having substantially straight top edges remote from said bottom, the top edge of said front wall being normally disposed above that of said rear wall, said side walls having upper edges extending from the top edge of said rear wall to the top edge of said front wall along arcuate lines centered on a horizontal axis disposed close to the junction of said front wall with said bottom, and positioning means on said body for stabilizing it in a forwardly inclined attitude in which the top edge of said rear wall lies forwardly of said axis and above the top edge of said front wall whereby the open top of said body becomes accessible from the front, the arcuate shape of said upper edges maintaining a substantially constant overall height for said body upon a swing thereof about a fulcrum substantially in line with said axis toward said forwardly inclined attitude from an upright normal position.

Helms, U.S. Pat. No. 4,350,366 describes a manually propelled lawn and garden cart comprising of a bottom storage box and an open frame securely fastened to the top of the bottom storage box, means to support lawn and garden tools in the open frame and the bottom storage box, preferably by tubes fastened between holes in a cross piece at the top of the open frame, and a similar cross piece which is the top of the bottom storage box. Wings are pivotably attached between extensions to the bottom storage box and the open frame. The wings have brackets attached to them which receive a trash bag bracket pivotably attached to the open frame near its top so as to hold the lawn and garden cart in a stable position. An adjustable leg is attached to the bottom of each wing which may be adjusted so as to touch the ground when the lawn and garden cart is placed in a horizontal position so that the adjustable legs, together with wheels attached to the bottom storage box, form a 4 point support. A back box attached to the open frame has side brackets attached to it to receive pivots attached to a handle. The lawn and garden cart may be stored in a very small space in an upright position by closing the wings, adjusting the adjustable legs and placing the handle in an upright position.

Herdies, U.S. Pat. No. 4,953,601 describes a tool-box comprising of a female box and a male box which is retractable in the female box or which may be rigidly set on the female box so as to form a workbench and/or a stepladder. The male box comprises two series of drawers and, between those two series, a tiltable and removable tray having two compartments. The tray may be tilted on one side up to a stop and may be removed on the other side.

Shepherd, U.S. Pat. No. 5,064,256 describes a lateral file cabinet having at least two drawers and wherein the drawers are mounted for forward and outward tilting movement so as to provide access to the interior of each drawer. A principle feature of the file cabinet is that when one drawer is open, the other drawer of a two drawer file cabinet cannot be opened. An open lower drawer prevents a next upper drawer from being opened and an opened upper drawer prevents a next lower drawer from being opened.

LeBrun, U.S. Pat. No. 5,148,917 describes a multiple tool organizing and storing carrier including a central housing, a pair of opposite side doors, a lid and a plurality of tool holders. The central housing has a bottom wall and upright opposite end walls and an upright partition extending between the opposite end walls. The side doors are pivotally mounted along lower edges thereof to opposite edges of the bottom wall of the central housing. The side doors are pivotable between opened positions away from the central housing and closed positions engaged with opposite side edges of the end walls of the central housing. The lid is hinged to an upper edge of one of the side doors and is pivotally movable for opening away from and closing upon an open top formed by the end walls of the central housing and the side doors when in their closed positions. The tool holders are separately supported on opposite sides of the partition and on the interiors of the side doors.

Blohm, U.S. Pat. No. 5,224,531 describes a portable apparatus for storing tools in an organized fashion and which also converts to a combination saw table, router table and workbench. The apparatus can be readily maneuvered, loaded into a truck bed and stored when folded. It also provides a rigid work surface with easy tool access when in the set-up position.

Goring, U.S. Pat. No. 5,338,049 describes a saddle and equipment cart which consists of a main cabinet body having an open top with a storage compartment for storing various equestrian articles therein. A pair of spaced apart ground wheels are pivotally attached to a lower back end of the main cabinet body, for supporting the cart above the ground. A handle is attached to an upper front end of the main cabinet body for manual operation of the cart. A pair of spaced apart support legs are attached to a lower front end of the main cabinet body in a downward position, to cooperate with the ground wheels in supporting the cart on the ground. A lid is hinged to one side at the open top of the main cabinet body. A saddle bearer on the lid has a dorsal fin to receive and hold an equestrian saddle thereon. A boot valet being a pair of L-shaped rods are mounted to the back end of the main cabinet body, with each rod having a knob to retain each of a pair of riding boots in an inverted position thereon.

Parks, U.S. Pat. No. 5,893,572 describes a portable workstation including a storage structure and an integrated dolly. The storage structure resembles a generally-upright cabinet having a top platform with upward-folding expansion leaves. The storage structure is defined by a pair of vertical side walls spaced apart by a back wall. One fixed shelf and two folding shelves extend between the side walls. The shelves are useable as steps, but are securable in alternate, bin-forming positions. A box-storage chamber and flexible straps provide storage locations for tools. A wheeled dolly is attached to the storage structure by a pair of slide pins.

Schmidt, U.S. Pat. No. 5,927,837 describes a rolling toolbox, which has a generally rectangular frame. The frame forms an interior compartment and has a front plate with an opening therein, a rear plate and opposing end plates mounted thereon. The frame also has a top section mounted thereon which has a flat top surface and converging lower surfaces that extend into the interior compartment. Mounted to the frame in pivotal relationship are a pair of bins which each have an end plate, a retaining plate and opposing side plates. A number of holding members are mounted to the interior of the bins and a tray is removably housed within the bins on top of the holding members. A drawer is slidingly received within the frame through the drawer opening. The drawer has a pair of opposed ends which each have an outer perimeter corresponding to the shape of the drawer opening. The drawer has a holding plate mounted between the opposed ends in a recessed location from the outer perimeter. A plurality of holding pins are mounted on the holding plate such that the ends of the holding pins are in generally planar relationship with the outer perimeter of the opposed ends.

Tisbo et al., U.S. Pat. No. 6,086,073 describes a portable work center including a molded base panel having a plurality of clamping members, at least one wheel assembly support and at least one support leg in spaced relation to the wheel assembly support. A molded top panel is in spaced, parallel relation to the base panel, and has a plurality of clamping members, each corresponding to a clamping member on the base panel. A pair of opposingly oriented side panels extend between and connect the top and base panels to one another. A rear panel is positioned adjacent and between the side panels and extends between the top and base panels. A pair of pivotal front door panels is disposed in opposing relation to the rear panel and extends substantially between the top and base panels and the side panels. Together, the side panels, rear panel, top panel, base panel and door panels define an internal storage region and four corners. Corner support posts are positioned at each of the corners and extend between the base panel and the top panel. The posts traverse through and join the respective side panels with the rear panel and join the respective side panels with the front door panels. The posts positioned at the front corners are pintles defining axes for pivoting the front door panels relative to the side panels. Clamping member secure the posts to the top and base panels, and a wheel assembly is operably connected to the base at the wheel assembly support.

Cheng, US 2002/0117947 describes a toolbox module comprising a housing and a box received in the housing. The housing includes a number of holes in an upper side thereof and a corresponding number of protrusions on an underside thereof for engaging with the holes of another toolbox module. The housing includes at least one hanging hole in a rear side thereof. The housing may further include a vertical dovetail groove and a vertical dovetail column on the rear side thereof. The housing includes two opposite lateral outer surfaces. A vertical dovetail groove is defined in one of the lateral outer surfaces of the housing and a dovetail column is formed on another lateral outer surface of the housing.

The prior art teaches the use of portable combination workbenches and toolboxes, but does not teach such an apparatus with stable footing when at rest and mobile footing when raised for being pulled-along. The prior art also does not teach such a combination with tool and hardware storage facility tilted laterally for improved item security when being moved. The present invention fulfills these needs and provides further related advantages as described in the following summary.

SUMMARY OF THE INVENTION

The present invention teaches certain benefits in construction and use which give rise to the objectives described below.

The portable toolbox has a top, bottom, front and rear panels forming a box structure with opposing sides tilted off-vertical so as to converge upwardly. A plurality of hinged drawers and fixed bins are arranged on each side of the toolbox. The rear panel terminates at a pair of supporting feet for resting the apparatus on a supporting surface and a pair of wheels for moving the toolbox. The top panel provides an upwardly facing work surface with a pair of hand holes separated by a hand grip for carrying the apparatus. A forward and a rearward sliding retractable work surface extender frames are positionable between a retracted position, secured within the box structure and an extended position directed outwardly from the box structure for resting a workpiece.

A primary objective of the present invention is to provide an apparatus and method of use of such apparatus that provides advantages not taught by the prior art.

Another objective is to provide such an invention capable of storing a relatively large number of tools and hardware items and of dispensing these items in a convenient manner.

A further objective is to provide such an invention capable of both closed drawer storage and open bin storage in a manner wherein items stored therein are prevented from falling out of the drawers and bins when the invention is subject to vibration.

A still further objective is to provide such an invention capable of functioning as a storage facility, workbench, dispensing crib, step stool, and support for sitting.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 5:
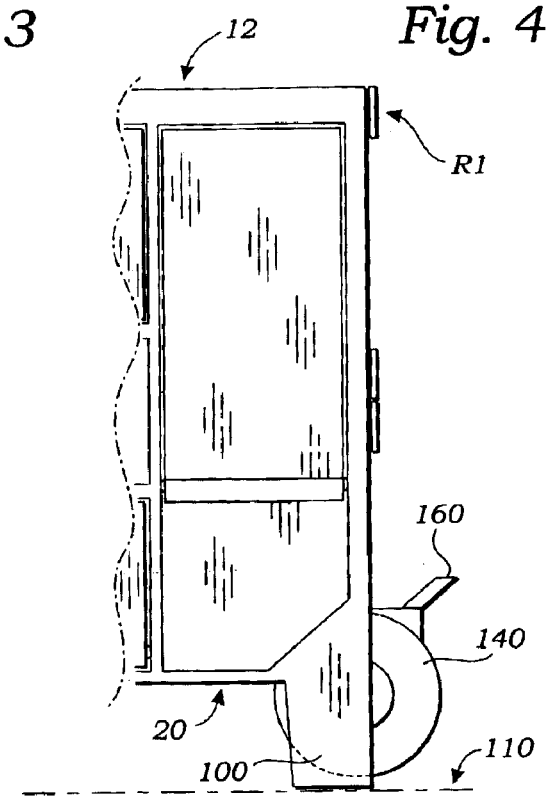
FIGS. 5 and 6 are partial side elevational views thereof showing a rear portion with extendable elements of the invention withdrawn and extended respectively.

The present invention is a portable toolbox apparatus with several other key functions which will be described below. A top 10, bottom 20, front 30 and rear 40 forming a box structure 50 with opposing sides 60, 70 tilted off-vertical and made-up of a plurality of hinged drawers 80 having hinged drawer front faces, the front faces positioned on both of the opposing sides 60, 70 of the apparatus in mutually convergent planes. Fixed bins 90 are positioned in sides 60, 70 as well. These drawers 80 and bins 90, being accessible from the outside of the apparatus, function as a parts and tool crib to make the availability of items needed in working more convenient. The tilt of the sides provides for maintaining closure of the drawers 80 and movement of items to the rear of the drawers and bins to prevent loss, as for instance, when the apparatus is moved on a rough surface and stored parts tend to vibrate and jump within their respective drawers and bins 80, 90. The rear panel 40 terminates downwardly at a pair of supporting feet 100 which are positioned for resting the apparatus in contact with a supporting surface 110. The top panel 10 provides an upwardly facing work surface 12 defining a pair of hand holes 14 separated by a hand grip 16 for carrying the portable toolbox. This surface 12, may be used to sit upon when working, to stand upon for reaching and for placing a workpiece (not shown) upon when working. A forward 120 and a rearward 130 sliding retractable work surface extender frames, are each linearly positionable between a retracted position "R1" within the box structure 50, as shown in FIGS. 2 and 5, and an extended position "E1" directed and positioned outwardly from the box structure 50, as shown in FIGS. 1 and 6, where partial and full extension is depicted.

Figure 1:
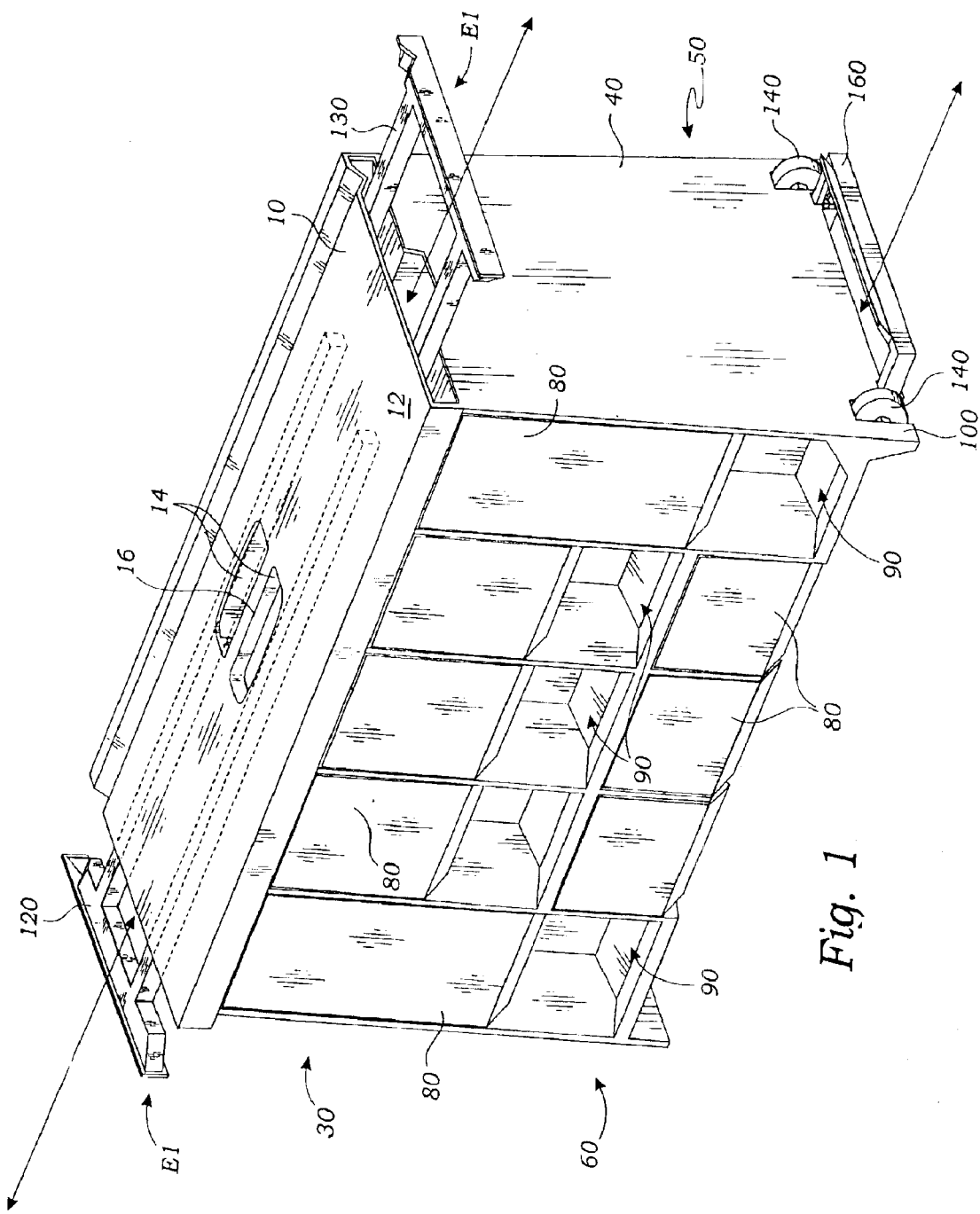
FIGS. 1 and 2 are perspective views of the preferred embodiment of the invention.
Figure 4:
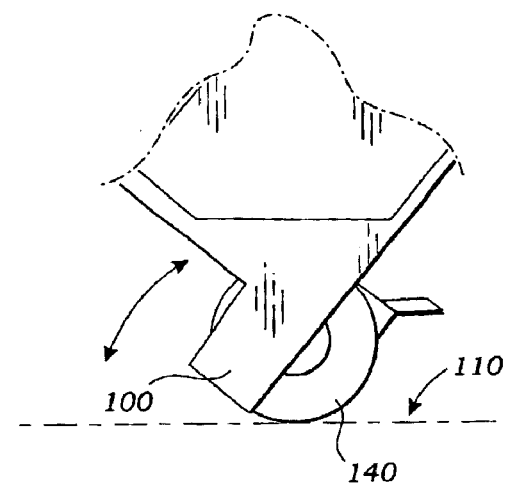

Preferably, a pair of spaced apart rotating wheels 140 are mounted, as shown in FIG. 1, adjacent to the rearwardly disposed supporting feet 100, the wheels 140 positioned above the supporting surface 110 when the apparatus is not being moved. The wheels 140 are positioned rearwardly such that with the pair of supporting rear feet 100 are in contact with the supporting surface 110, the wheels 140 are not in contact with the supporting surface 110, and with the front 40 of the apparatus lifted from the supporting surface 110, the wheels 140 are in contact with the supporting surface 110, while the supporting rear feet 100 are not in contact with the supporting surface 110. When not being moved, as shown in FIG. 5, the apparatus rests on the supporting feet 100 at the rear of the apparatus, and on the front panel 30 at the front of the apparatus. However, as discussed above, the wheels 140 contact the supporting surface 110 for supporting the apparatus in rolling motion, when the forward extender frame 120 is lifted as a handle for pulling the apparatus, and this is shown in FIG. 4 where the wheels 140 rather than the feet 100 contact the supporting surface 110. This relationship between the rear feet 100 and the wheels 140 is considered to be inventively novel and provides advantage over the prior art.

Figure 2:
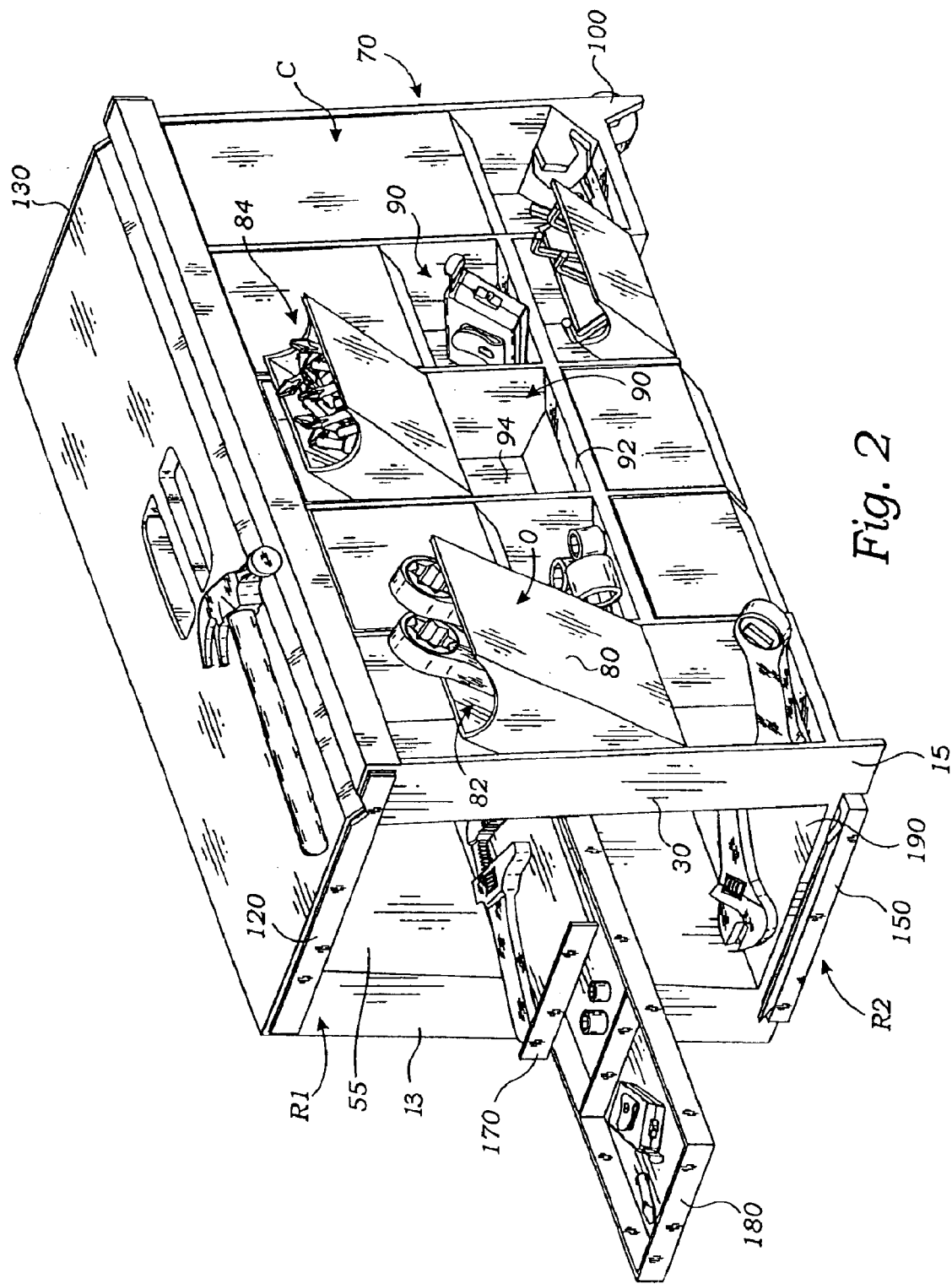
Figure 3:
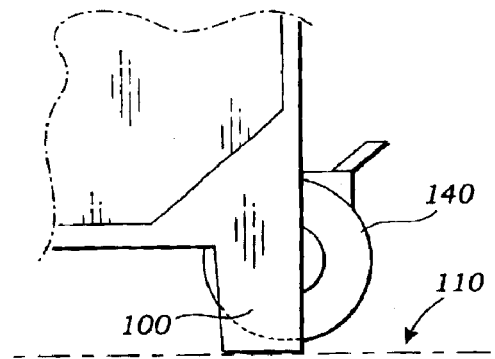
FIGS. 3 and 4 are partial side elevational views thereof.
Figure 6:
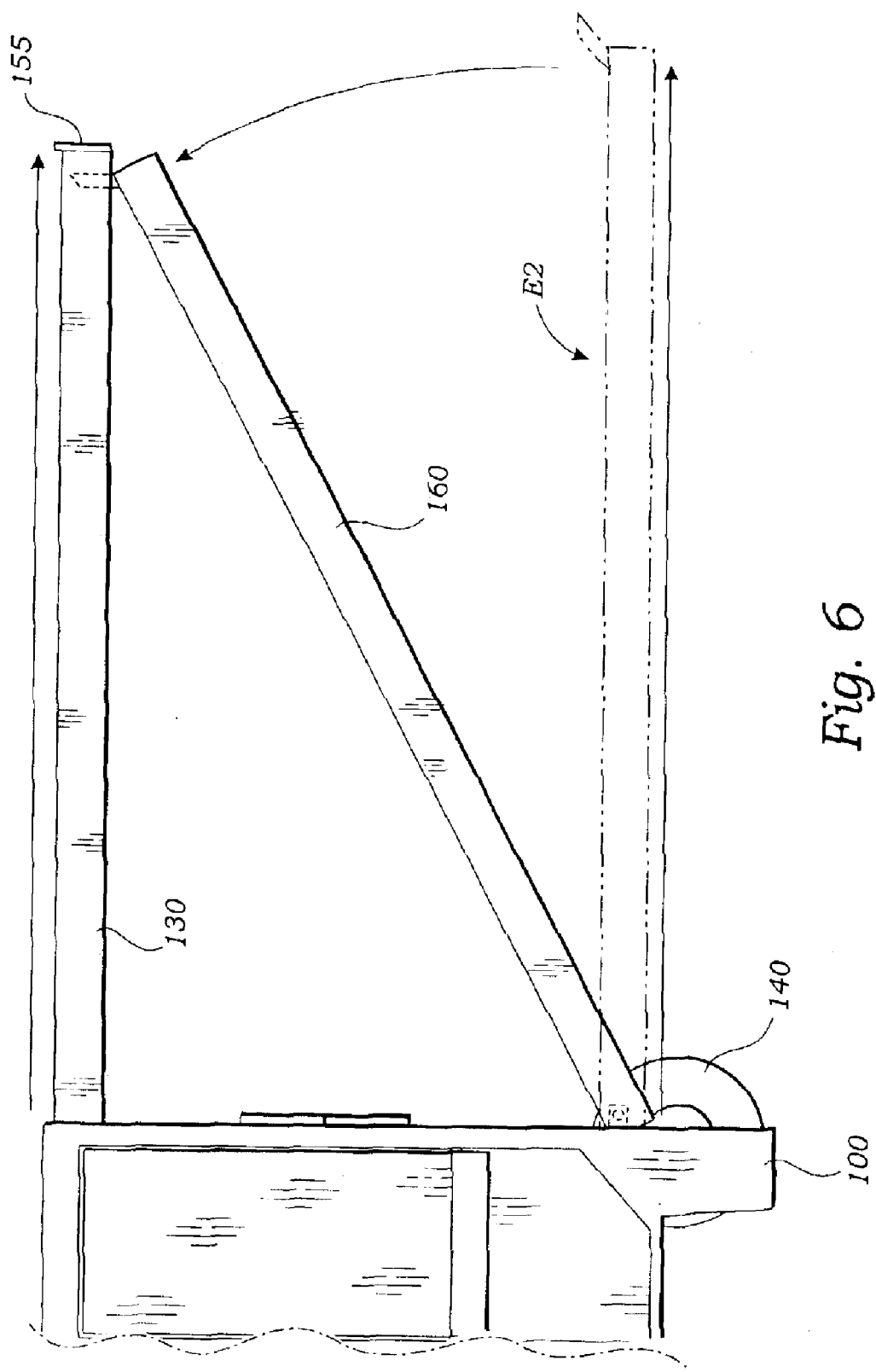

A forward 150 and a rearward 160 extender frame braces engage the box structure 50 and are enabled for linear positioning between a retracted position "R2" within the box structure 50, as shown in FIG. 2, and an extended position "E2" directed outwardly from the box structure 50, as shown in FIG. 1 (partially extended) and FIG. 6 (fully extended). The extender frame braces 150, 160 are each enabled for upward pivoting and engaging of a terminal end 155 of one of the extender frames for providing rigidizing support as the extender frames 120, 130 are designed to receive loads in supporting work pieces.

Each one of the hinged drawers 80 comprises an open top pocket structure 82 providing an interior drawer volume 84. Each hinged drawer 80 is movable between a closed attitude "C" wherein the interior drawer volume 84 is inaccessible and an open, laterally outwardly tilted, attitude "O" providing access to the interior drawer volume 84 for placement and removal of tools and hardware. Preferably, each one of the fixed bins 90 provides a bottom bin surface 92 angled for urging hardware toward a rear wall 94 of the fixed bin 90.

The front panel 30 comprises a left 13 and a right 15 front panel portions, where the front panel portions are spaced apart (FIG. 2) providing access to an interior box volume 55. At least one sliding shelf 170 is mounted on side strips within the volume 55, for enabling movement thereof between a retracted shelf position fully enclosed within the interior box volume 55, and an extended shelf position partially extending forward of the front panel 30 for providing access to tools and parts placed on it. Further, an interior drawer 180 may be similarly mounted for sliding access as further shown in FIG. 2. An interior bottom surface 190 is provided for storing heavy items and raw materials.

It is noted that the Schmidt reference teaches simple wheels, and Whitten teaches legs and wheels which are not related by tilting of one end of the apparatus upward. Clearly, the ability to have the stability of legs when the apparatus is not being moved, and the utility of wheeled support when the apparatus needs to be moved, without any preparation other than lifting one end of the apparatus, as with a wheel barrel, is a significant advantage in a tool chest that must be moved from one location to another frequently, as in the present invention.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A portable toolbox apparatus comprising: a plurality of hinged drawers having hinged drawer front faces, the front faces positioned on both of opposing sides of the apparatus in mutually convergent planes; a rear panel of the apparatus terminating downwardly with a pair of supporting rear feet positioned for resting the apparatus in contact with a supporting surface; a top panel providing an upwardly facing work surface; a forward extender frame; a rearward extender frame, both of the extender frames positionable between a retracted position within the apparatus, and an extended position extending outwardly from the apparatus; and a pair of wheels, the wheels positioned rearwardly on the apparatus such that with the pair of supporting rear feet in contact with the supporting surface, the wheels are not in contact with the supporting surface, and with a front of the apparatus lifted from the supporting surface, the wheels are in contact with the supporting surface, while the supporting rear feet are not in contact with the supporting surface, whereby, the apparatus is enabled for rolling on the supporting surface; at least one of a forward and a rearward extender frame braces each linearly positionable between a retracted position fully within the apparatus and an extended position extended outwardly from the apparatus; each of the extender frame braces pivotable upwardly in support of one of the extender frames.

2. The apparatus of claim 1 wherein each one of the hinged drawers comprises an open top pocket structure providing an interior drawer volume, the hinged drawers movable between a closed attitude wherein the interior drawer volume is inaccessible and an open, laterally outwardly tilted, attitude providing access to the interior drawer volume for placement and removal of tools and hardware in, and from, the hinged drawers.

3. The apparatus of claim 1 wherein each one of the fixed bins provides a bottom bin surface angled for urging hardware toward a rear wall of the fixed bin.

4. The apparatus of claim 1 further comprising at least one sliding shelf positionable between a retracted shelf position fully enclosed within the apparatus, and an extended shelf position partially extending forward of the front of the apparatus.

* * * * *